US012147786B2

(12) United States Patent
Malik et al.

(10) Patent No.: US 12,147,786 B2
(45) Date of Patent: Nov. 19, 2024

(54) COMPUTER-BASED SOFTWARE DEVELOPMENT AND PRODUCT MANAGEMENT

(71) Applicant: International Business Machines Corporation, Armonk, NY (US)

(72) Inventors: Deepak Malik, Gurgaon (IN); Sudarshan, Ghaziabad (IN); Anita Duggal, Delhi (IN); Hemant Singh, Gurgaon (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 17/821,582

(22) Filed: Aug. 23, 2022

(65) Prior Publication Data
US 2024/0069870 A1  Feb. 29, 2024

(51) Int. Cl.
G06F 9/44 (2018.01)
G06F 8/10 (2018.01)
G06F 8/20 (2018.01)

(52) U.S. Cl.
CPC . *G06F 8/10* (2013.01); *G06F 8/20* (2013.01)

(58) Field of Classification Search
CPC ........................................................ G06F 8/10
USPC ........................................................ 717/100
See application file for complete search history.

(56) References Cited

U.S. PATENT DOCUMENTS

| | | | |
|---|---|---|---|
| 7,143,036 B2* | 11/2006 | Weise | G06F 40/216 704/245 |
| 9,043,744 B2 | 5/2015 | Roberts | |
| 9,640,194 B1* | 5/2017 | Nemala | G10L 21/0232 |
| 9,760,560 B2* | 9/2017 | Corston | G06F 40/253 |
| 10,418,026 B2* | 9/2019 | Des Jardins | G10L 15/005 |
| 10,592,542 B2* | 3/2020 | Fukuda | G06F 16/243 |
| 2005/0278325 A1* | 12/2005 | Mihalcea | G06F 40/284 |
| 2014/0019128 A1* | 1/2014 | Riskin | G16H 10/60 704/235 |
| 2014/0201704 A1 | 7/2014 | Boden | |
| 2016/0225187 A1 | 8/2016 | Knipp | |
| 2019/0180739 A1* | 6/2019 | Raja | G06F 40/35 |
| 2021/0058264 A1* | 2/2021 | Fahrendorff | H04L 12/1822 |

(Continued)

OTHER PUBLICATIONS

"Recording conversation items in user story", Visual Paradigm User's Guide, Part XV. Agile development, Chapter 2. User Story, last retrieved from internet Aug. 3, 2022, 3 pages, <https://www.visual-paradigm.com/support/documents/vpuserguide/2607/2825/86246_recordingcon.html>.

(Continued)

*Primary Examiner* — Evral E Bodden
(74) *Attorney, Agent, or Firm* — Joseph P. Curcuru

(57) ABSTRACT

In an approach to improve converting conversation to user stories, embodiments capture keywords from a captured discussion, and identify the probability of the keywords being an object attribute or action behavior. Further, responsive to identifying, based on the probability, that the keywords are the object attribute or the action behavior, embodiments determine that the object attribute or the action behavior are not new to a first user story. Additionally, embodiments determine that the attribute or the action behavior are associated with an existing object in a first user story, and update the first user story with the attribute or the action behavior.

20 Claims, 4 Drawing Sheets

(56) References Cited

U.S. PATENT DOCUMENTS

2024/0020369 A1\* 1/2024 Li .......................... G10L 15/22

OTHER PUBLICATIONS

"Visualise User Stories With Test Modeller", Curiosity Software, © 2022, 3 pages, <https://www.curiositysoftware.ie/visualise-jira-stories-avoid-requirements-defects-generate-automated-tests>.

Francino, Yvette, "An agile leader's guide to writing user stories", TechBeacon, retrieved from internet Mar. 2, 2022, 3 pages, <https://techbeacon.com/app-dev-testing/agile-leaders-guide-writing-user-stories>.

Lucassen, et al., "Improving agile requirements: the Quality User Story framework and tool", Requirements Engineering, vol. 21, No. 3, Sep. 2016, pp. 383-403, <https://www.researchgate.net/publication/299576904>.

Mell, et al., "The NIST Definition of Cloud Computing", National Institute of Standards and Technology, Special Publication 800-145, Sep. 2011, 7 pages.

Pereira, Angela Cristina, "Using NLP to Generate User Stories from Software Specification in Natural Language", Dissertation, Masters in Informatics in the Program Graduate Studies in Informatics, Federal University of Paraná, 2018, 84 pages.

\* cited by examiner

COMPUTER-BASED SOFTWARE DEVELOPMENT AND PRODUCT MANAGEMENT

BACKGROUND OF THE INVENTION

The present invention relates generally to software development and product management, and more particularly to the field of agile or other new age software development lifecycle (SDLC) frameworks.

In software development and product management, a user story is an informal, natural language description of features of a software system. User stories are written from the perspective of an end user or user of a system, and may be recorded on index cards, notes, or digitally in project management software. One of the tools to communicate between the product owner (the customer) and the development team is the user story. Martin Fowler and Kent Beck define a user story as " . . . a chunk of functionality (some people use the word feature) that is of value to the customer . . . . The shorter the story the better. The story represents a concept and not a detailed specification." User stories act as the common language between all participants in the development process: product owners, architects, designers, and developers must share a common understanding of stories. An individual can achieve this common language by focusing on the value that each story provides to users. This idea of user value can be understood across disciplines and is key in prioritization, design, and implementation decisions. A user story envisions and describes a future in which a small increment of user value is delivered.

As user stories rise in priority in the backlog, the team must communicate with the stakeholders—both architects and customers who want the user story—to ensure that when the story is delivered, it satisfies the stakeholder requirements. The team can store the results of stakeholder communications directly in the tracking system. That way, all the information that is needed to design, implement, test, and deliver the user story is in one place. The repository where you manage user stories must be readily accessible to the entire team. To track use stories, tools such as Kanban boards and dashboards are utilized, which enable users to identify where each story is, the rank of the story in the backlog and on the progress path of the user story through development and testing.

SUMMARY

Embodiments of the present invention disclose a computer-implemented method, a computer program product, and a system, the computer-implemented method comprising: capturing keywords from a captured discussion; identifying a probability of the keywords being an object attribute or action behavior; responsive to identifying, based on the probability, that the keywords are the object attribute or the action behavior, determining that the object attribute or the action behavior are not new to a first user story; determining that the attribute or the action behavior are associated with an existing object in the first user story; and updating the first user story with the attribute or the action behavior.

Further, embodiments of the present invention disclose the computer-implemented method comprising: performing probabilistic calculation to determine if new keywords are attached to existing user story or new user story, responsive to identifying, based on the probability, that the keywords are the object attribute or the action behavior, determining that the object attribute or the action behavior are new; and generating a secondary user story based on the new object attribute or action behavior, detecting and removing of noise in the captured discussion, capturing a discussion, wherein the discussion is a live discussion or conversation, a pre-recorded discussion, or a messaging thread, saving the capture discussion on one or more databases, and generating a graph based on the captured keywords.

DETAILED DESCRIPTION

Figure 1A:
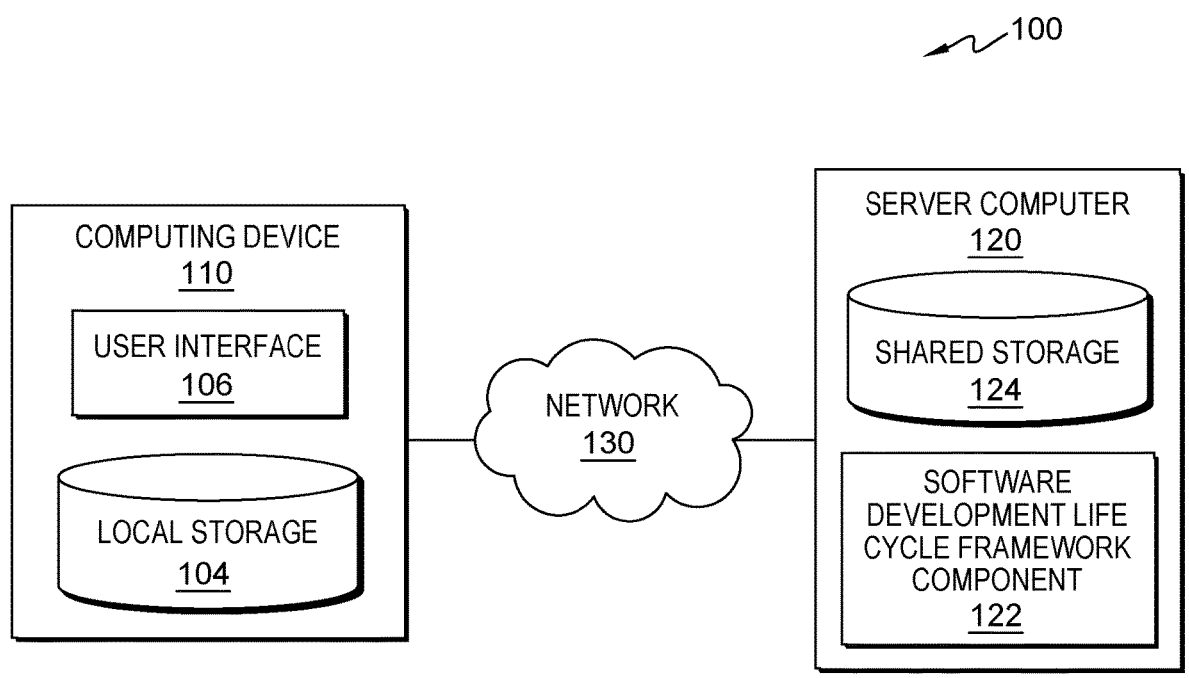
FIG. 1A is a functional block diagram illustrating a distributed data processing environment, in accordance with an embodiment of the present invention.

Since the inception of Agile or other new age software development lifecycle (SDLC) frameworks, embodiments of the present invention have recognized a shift in focus from documentation to "Working Software," which is quite in-line with the Agile manifesto. Where, SDLC is a framework that development teams use to produce high-quality software in a systematic and cost-effective way. However, embodiments of the present invention recognize that it is important to exercise caution in terms of deciding what documentation is required and what data can be chosen or ignored. Further, embodiments of the present invention recognize that complete documentation of requirements of a project may not be available, requirements discussed during backlog refinement or in other meetings (e.g., stand-up/playback) may not be properly documented, undesired one liner stories may be created without required details based on discussions in multiple meetings, and requirements discussed in meetings may be lost.

For example, in business documentation, created by waterfall methodology, all the functional and non-functional requirements are captured in a descriptive and detailed manner. Whereas agile methodology is restricted to the user stories. User stories are expected to be detailed and descriptive. However, embodiments of the present invention recognize that, generally, one line stories are entered into contract lifecycle management (CLM) or a work management tool (e.g., JIRA) just for sake of creating a user story and using the created user story to discuss the details in the backlog refinement call or requirement review. Where details of the one-line user story are discussed in a call of which the development team proceeds with the development based on said call, wherein these stories might not be of any value. Waterfall methodology is a project management approach that emphasizes a linear progression from the beginning to the end of a project. Embodiments of the present invention recognize that waterfall methodology, often used by engineers, is front-loaded and thus relies on careful planning, detailed documentation, and consecutive execution. Further, embodiments of the present invention recognize that agile and waterfall methodologies are two distinctive methodologies of processes to complete projects or work items. Agile is an iterative methodology that incorporates a cyclic and collaborative process. Waterfall is a sequential methodology that can also be collaborative, but tasks are generally handled in a more linear process.

Currently, embodiments of the present invention recognize that the agile methodology is dominant meaning high level requirements are captured on work management tools like Jira, and story grooming takes place over a conference platform (e.g., video and/or voice platform). Thus, embodiments of the present invention recognize that it has become increasingly difficult to capture all the relevant information of a call and put it into a tool. Embodiments of the present invention recognize that existing solutions just capture the voice conversation as is, however, existing solutions are unable to identify and covert a meaningful information (action items/notes, etc.) into relevant user stories. Further, embodiments of the present invention recognize that the methods known in the art do not consider the determination of the context-based alignment to a user story with the context and determining factors being based on the style of the user story captures for software development. Moreover, embodiments of the present invention recognize that methods known in the art either convert conversations to stories or deal with regular story telling using artificial intelligent (AI) driven modifications; however, they do not show the detailed analysis and determination of alignment of a conversation sentence set to a user story in an epic, wherein epics are large bodies of work that can be broken down into a number of smaller tasks (called stories), and wherein initiatives are collections of epics that drive toward a common goal.

Embodiments improve the art and solve at least the issues stated above by converting conversation to user stories (user story converter/updater). More specifically, embodiments improve the art and solve at least the issues stated above by (i) reducing the amount of data required to enter a user story triad, (ii) using one or more enhanced Venn diagrams to represent user stories, (iii) performing probabilistic calculation to determine if new words are attached to existing user story or new user story, (iv) creating sentence to generate new or update existing user story, and (v) detecting and removing noise within one or more received, retrieved, and/or monitored conversations.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of generating, editing/updating, and/or monitoring user stories. These embodiments may also include periodic reminders of such recording and monitoring throughout the course of any such use. Certain embodiments may also include regular (e.g. daily, weekly, monthly) reminders to the participating parties that they have consented to being recorded and monitored for generating, editing/updating, and/or monitoring user stories, and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

Implementation of embodiments of the invention may take a variety of forms, and exemplary implementation details are discussed subsequently with reference to the Figures (i.e., FIG. 1A-FIG. 3).

FIG. 1A is a functional block diagram illustrating a distributed data processing environment, generally designated distributed data processing environment 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), augmented reality (AR) glasses, a virtual reality headset, any head-up display (HUD) known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments, computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to software development life cycle framework component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 3.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

Component 122 may be a solution built on technologies that may extract relevant information from discussions that can user stories, that satisfy one or more predetermined requirements, for an entire project team, wherein the discussions are live discussion or conversation, a pre-recorded discussion, and/or a messaging thread.

Component 122 may capture the relevant information from a story grooming call and insert the captured relevant information it into the relevant stories, via a work management tool. Relevant information is information (e.g., captured sentences) that is not identified and/or labeled as noise (e.g., sentences that contain {new actor, new actions} or new triads). Relevant user stories are the stories that are considered in the sprint/iteration of any Agile project defined in an issue tracking and project management tool, wherein the stories or parameters of the stories are predetermined and/or predefined. Component 122, via a natural language processor (NLP), may capture predetermined keywords from a monitored and/or received discussion, and create business rules based on the captured keywords. Component 122 may identify whether keywords (i.e., information) are associated with requirements, wherein if the information is associated with one or more requirements then component 122 ensures that the information that is related to a specific requirement is posted against one or more existing requirements. In the event the information being discussed does not fall into any of the existing requirement, component 122 may create a new user story in a work management tool and put the information under the user story in the work management tool. In various embodiments, component 122 continually trains the database with new keywords, wherein, the keywords are predetermined and received from a database or a user. In various embodiments, a conversation turn is recognized by one or more predetermined keywords or business rules that have or do not have a relationship with a prior story, though the context is same for both user stories based on the Epic, but the requirement may be different. For unique keywords probabilistic estimation of whether the keyword can be called an attribute of an object or behavior of an action is made and based on the style of the user story decomposition (e.g., is made as part of a previous user story or a different user story).

Known meeting tools capture the conversation as is; however, there are no known options that convert the captured conversation into user stories. Further, known agile project management software only give an option to upload stories in a defined format, and they do not create and/or update user stories based on unstructured data. Component 122 may solve at least these particular issues and improve the art of user stories by (i) reducing the amount of data required to enter a user story triad, (ii) using one or more enhanced Venn diagrams to represent user stories, (iii) performing probabilistic calculation to determine if new words are attached to existing user story or new user story, (iv) creating sentence to generate new or update existing user story, and (v) detecting and removing noise within one or more received, retrieved, and/or monitored conversations. In various embodiments, component 122 may convert conversation to user stories (user story converter/updater). In various embodiments, component 122, via a speech to text tool, records the session or integrates with a web meeting tool and captures the conversation through microphone access enabled by the web meeting tool. Component 122 may reduce the amount of data required to enter a user story triad by utilizing sentences from the recorded conversation and extracting the {subject, verb, object} triad from the sentences.

In various embodiments, component 122 creates user stories based on captured conversations and based on an analysis of the captured conversation. In various embodiments, the analysis comprises the use of Venn diagrams to identify existing stories, stored in local storage 104 and/or shared storage 124, that have overlap with one or more captured conversations and identify any enhancements to an existing story, or identify one or more topics discussed in the conversation that do not overlap with the one or more existing stories, and create new user stories based on the identified topics that do not overlap with the one or more existing stories. Existing stories may be previously created and/or stored user stories that can be retrieved and/or accessed. In various embodiments, component 122 extracts predetermined keywords and/or predetermined business rules from captured conversations, and creates triads of {actors, actions, logic} for one or more predetermined requirements (i.e., parameters) based on the extracted one or more predetermined keywords and/or business rules.

In various embodiments, when new words, unrelated to existing stories are found and are not synonyms to the predetermined keywords, then component 122 performs a probabilistic calculation (e.g., applying a probability theory to the Venn diagram data) to determine if the new words are associated with an existing user story. Component 122 may capture predetermined keywords (i.e., keywords) from a conversation to create a logical Requirement/Story based on the capture keywords. In various embodiments, based on the probability of a keyword being an object attribute or action's behavior, component 122 creates either a new user story or, if the existing keyword has a different meaning contextually, updates one or more existing stories. In various embodiments, component 122 reduces the noise from a captured discussion by identifying, via natural language processing, statements, phrases, and/or sentences that are not within the predetermine context of the predetermined requirement of the user story.

In various embodiments, component 122 utilizes unrestricted NLP and an undefined or predetermined template. Component 122, via NLP and a predetermined template, may identify noise in a captured discussion and determine if the identified noise should be removed based on predetermined parameters to enhance and/or develop one or more user stories, via a probabilistic calculation. In various embodiments, based on the calculation, component 122 determines whether new terms (i.e., terms that have not been previously identified in the captured discussion) will be used to update existing stories or create new user stories. Component 122 may analyze one or more conversations, remove the noise by identifying terms, phrases, and/or sentences that indicate that the conversation is general and not specific to a behavior (verb) of a predetermined attribute of an object for a new user story. Behavior refers to the actions that an object/entity's attribute value change which could trigger one or several business rules to be applied and result in the action to be taken. In various embodiments, component 122 identifies an attribute (e.g., behavior) independent of the sentiment of whether it is associated with an existing (e.g., developing) user story. Component 122 may identify noise in a conversation to eliminate and solve an identified or predetermined need by parsing through a current discussion and/or previously monitored and/or analyzed discussions. In one embodiment, component 122 analyzes each word in a discussion to determine if it is a new feature and/or function and determines the new feature can extend the current solution into new spaces. For example, as further detailed below, terms "guest user" and "deals" are new words, "guest user" is tagged to the login behavior, while "deals" is not found in the existing user story and is in the same sentence as the guest user and login behavior (so it cannot be a noise). Further, "deals" is identified as a potential new feature. Component 122 may compare a pain point or an identified solution to a pain point with one or more existing solutions and proposes an implementation for the identified solution while component 122, concurrently, is pivoted around the relationships in the new behavior/attributes with the existing user stories, wherein relationships exist between the attributes of different objects and the behaviors. For instance, as detailed in the example below, the pain point of a guest user is that the guest user does not see the "deals" related to the product that is given to registered users, wherein related to the user story (i.e., user story relation) is the search feature for users to search for a product, wherein the users are shown the products that meet the entered search criterion and deals related to the product.

For example:

User Story:
   As a website user, I want the ability to search on the webpage so that I can find the necessary/requested information.

Acceptance Criteria:
   User searches for an item by its name
   "Given that I'm in a role of registered or guest user
   When I open the "Products" page
   Then the system shows me the list of all products
   And the system shows the "Search" section in the right top corner of the screen. When I fill in the "Search" field with the name of the existing item in the product list and I click the "Apply" button OR press the Enter key on keyboard. Then the system shows products in the "Search Results" section with product names matching entered product name.

Figure 1B:
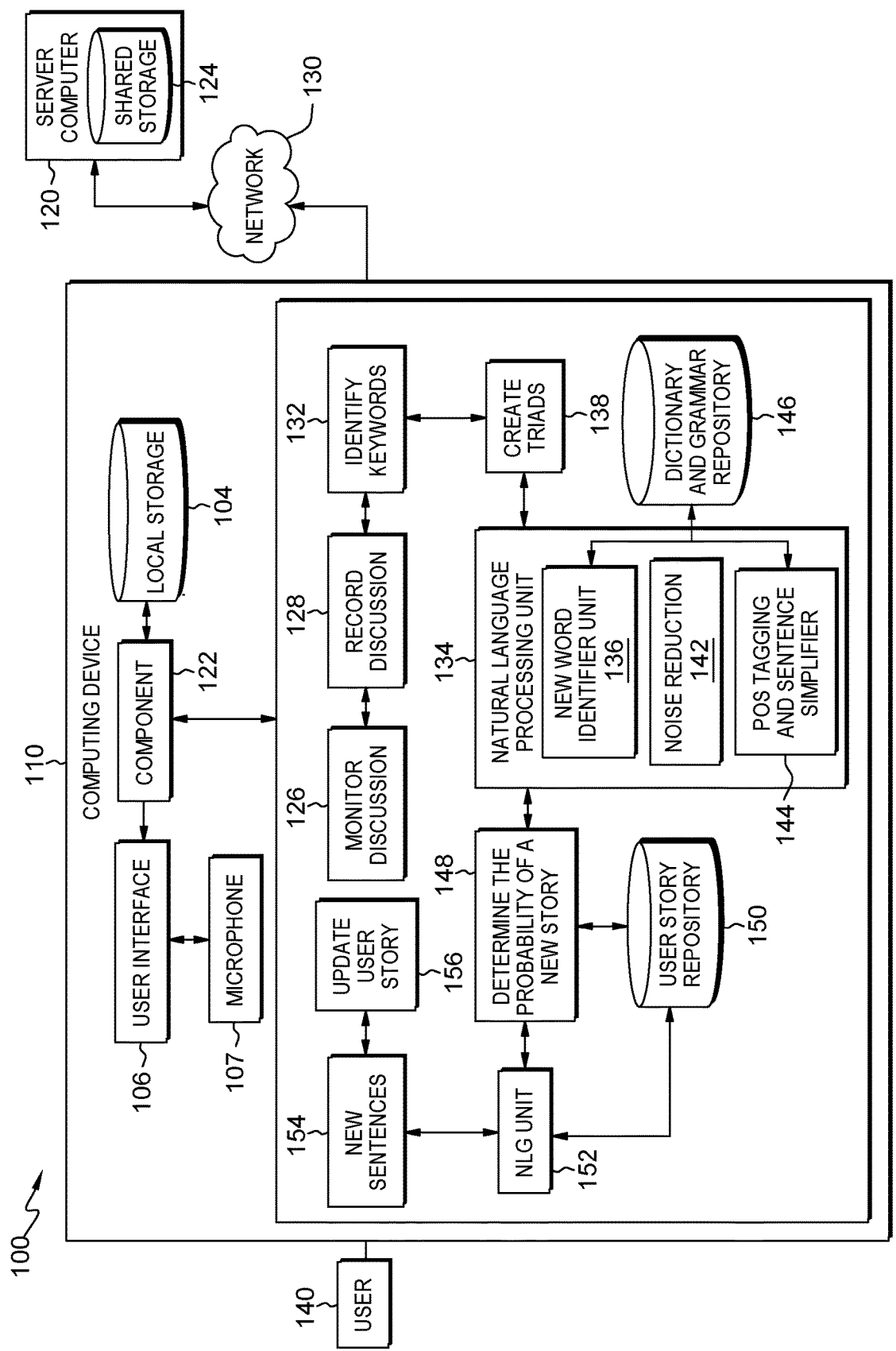
FIG. 1B is a functional block diagram illustrating a distributed data processing environment of a software development life cycle framework component, in accordance with an embodiment of the present invention.

FIG. 1B is a block diagram illustrating a distributed data processing environment, generally designated distributed data processing environment 100, detailing component 122, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

In the various embodiments, component 122 converts a conversation to a user stories. In the depicted embodiment, component 122 monitors a discussion 126, via microphone 107 on computing device 110. Component 122 may capture one or more discussion between one or more users, via microphone 107, and/or text via interface 106. Microphone 107 is a is a transducer that converts sound into an electrical signal and/or any microphone as it is known and understood in the art. In the depicted embodiment, component 122 records the discussion 128. Component 122 may record monitored discussion 126 (i.e., records discussion 128). Component 122 may convert, through known techniques (NLP), recorded discussion 128 into text (i.e., converted text). Component 122 may store the converted text on local storage 104 and/or shared storage 124 (e.g., a database). In various embodiments, component 122, via a speech to text tool, converts captured speech from a monitored and/or recorded discussion and stores the converted text on a non-tabular database (e.g., NoSQL database). Component 122, via NLP, may identify one or more predetermined keywords (identify keywords 132) from the recorded or monitored discussion.

In the depicted embodiment, component 122 extracts one or more predetermined keywords and/or predetermined business rules from captured conversations and creates triads (creates triads) 138 comprising {actors, actions, logic} associated with one or more predetermined requirements (i.e., parameters) based on the extracted one or more predetermined keywords and/or business rules. In various embodiments, component 122 reduces a predetermined parameter/rule into a user story triad, component 122 generates a graph of predetermined keywords (e.g., a tree structure) showing different objects as branches and predetermined behaviors as leaves. Behavior leaves may link to multiple branches on the generated graph. In various embodiments, generating a graph of predetermined keywords comprises: (i) extracting predetermined keywords and/or business rules using tools like requirement analytics, (ii) creating triads of {actors, actions, logic} for one or more predetermined parameters (i.e., requirements), (iii) creating a graph (e.g., tree structure or a Venn diagram) across two or more user stories, (iv) determining, based on received or generated text from a captured discussion, whether the speech-to-text conversation utilizes keyword grouping from sentences into one conversation and if there are multiple conversation threads, then for each identified thread (i.e., secondary thread), component 122 verifies with predetermined keywords (e.g., keywords associated with {actors, actions}) whether the conversation thread belongs to existing user stories, (v) listing identified new words separately in each conversation thread, and (vi) creating a new story if the identified actors or actions are new or the actor/action are existing but there are identified new attributes.

In various embodiments, component 122 determines, based on received or generated text from a captured discussion, whether the speech-to-text conversation utilizes keyword grouping from sentences into one conversation, described above, by utilizing the new words, and the frequency of other keywords belonging to user story"n" determine by probability if the new word can be an attribute or action. P(word a e.g deal)=$n_{deal}/\Sigma$(n keywords ε user story, in conversation segment) (ε—symbol for "belonging to"), wherein the key words of the user story are first determined. Where multiple user stories are defined, such a list will be made for each user story. In the conversation, the identified keywords from the conversation between the participants are mapped to this list to identify one or several common keywords across user stories (selecting one that has the largest match between attributes and behaviors). As the meeting conversation extends, one or several participants may switch to speaking of another user story identified when the keywords from the conversation segment do not have any common keywords to the identified user story, but match to the list of another user story. This indicates a turn in the conversation. Each conversation segment is analyzed to see if the mapping with the user story of the previous segment continues or the mapping is exclusively matching another user story or matching a join of the keywords of two or more user stories.

In the depicted embodiments, component 122, via natural language processing unit (unit) 134, identifies is the one or more identified keywords is a new word. Component 122 utilizes unit 134 and new word identifier 136 to identify if an identified keyword is new by analyzing previously identified and/or stored keywords in dictionary and grammar repository (repository) 146. Component 122 may utilized part-of-speech (POS) tagging and sentence simplifier 144 to identify if the one or more identified keywords matches one of the previously identified and/or stored key words in repository 146. If component 122 identifies the identified one or more keywords as new or previously identified keyword then component 122 calculates the probability of the new or previously identified keyword being an attribute or action in the current user story, wherein if the calculated probability is below a predetermined threshold then noise reduction unit 142 labels the keyword as noise and removes the noise from the conversation. However, if the calculated probability is above a predetermined threshold then component 122, utilizing user story repository 150, determines the probability of creating a new story 148. In various embodiments, component 122 executes a probabilistic calculation to determine if new words are attached to existing user story, stored on user story repository 150, or a new user story, wherein if the calculation is above a predetermined threshold then component 122 will create a new user story based on the identified keywords. However, if the calculation is below a predetermined threshold then component 122, via natural language generation (NLG) unit 152, generates new sentences 154, based on created triads 138, to update the user story 156.

Figure 2:
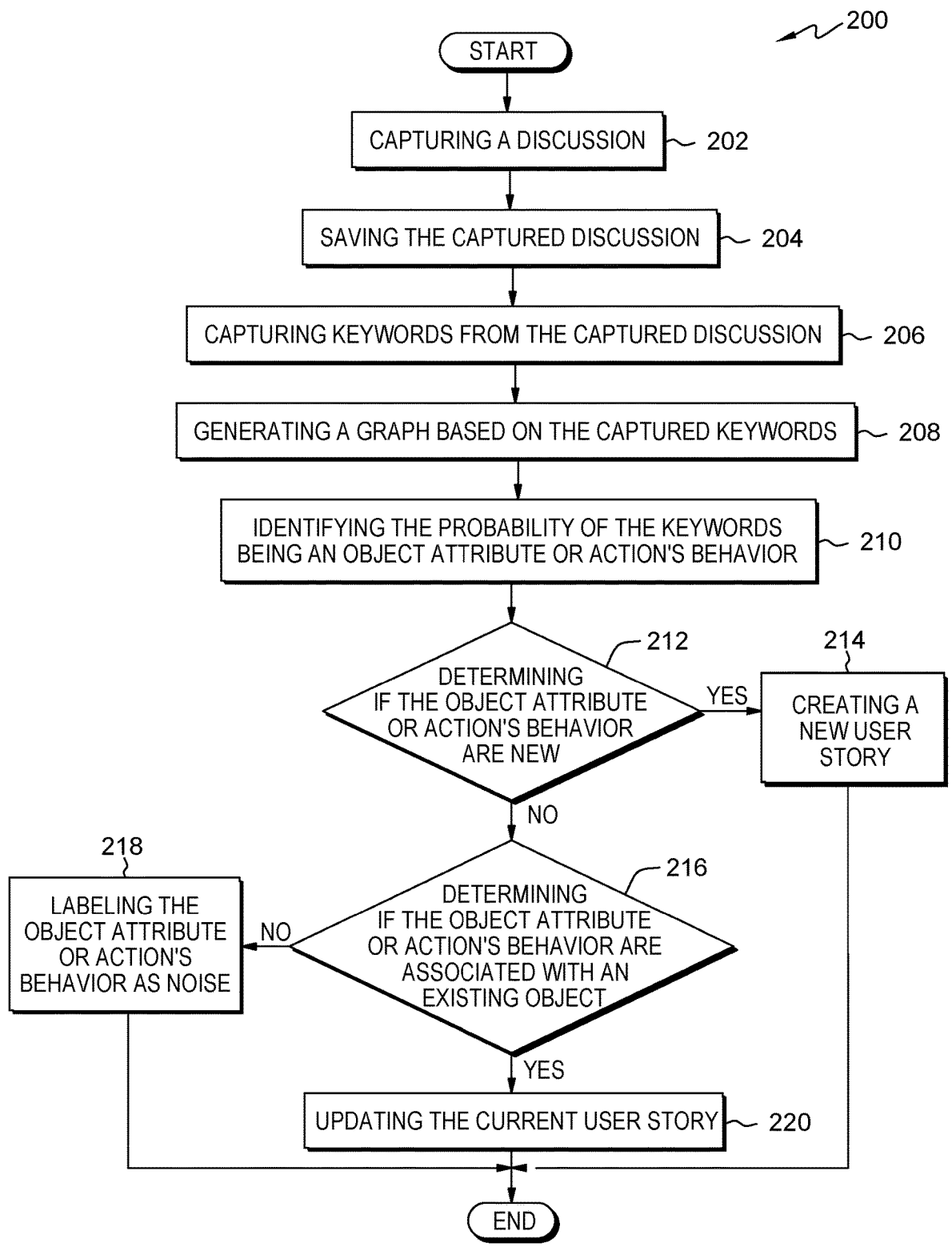
FIG. 2 illustrates operational steps of the software development life cycle framework component, on a server computer within the distributed data processing environment of FIGS. 1-2 in accordance with an embodiment of the present invention.

FIG. 2 illustrates operational steps of component 122, generally designated distributed data processing environment 200, in communication with server computer 120, within distributed data processing environment 200, for a computer-based implementation of a service chain node adequacy framework, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, captures a discussion. In various embodiments, component 122 may capture one or more discussion between one or more users. The discussion may be textual or verbal notes of a user (e.g., self-written notes or talking/thinking outload into recorder), a text chat between two or more users, a text chat between one or more users and a chatbot, and/or a verbal discussion between two or more users.

In step 204, component 122 saves the converted text to a local storage 104 and/or shared storage 124 (e.g., a database). In various embodiments, component 122, via a speech to text tool, converts captured speech from a monitored and/or recorded discussion and stores the converted text on a non-tabular database (e.g., NoSQL database) because of the unstructured data.

In step 206, component 122 captures keywords through a NPL tool. In various embodiments, component 122, via one or more analytic and/or NLP tools and/or techniques, captures one or more predetermined keywords to create a logical requirement/user story out of the captured discussion.

In step 208, component 122 generates a graph of predetermined keywords. In various embodiments, component 122 generates a graph of predetermined keywords (e.g., a tree structure) showing different objects as branches and predetermined behaviors as leaves. Behavior leaves may link to multiple branches on the generated graph. In various embodiments, generating a graph of predetermined keywords comprises: (i) extracting predetermined keywords and/or business rules using tools like requirement analytics, (ii) creating triads of {actors, actions, logic} for one or more predetermined parameters (i.e., requirements), (iii) creating a graph (e.g., tree structure or a Venn diagram) across two or more user stories, (iv) determining, based on received or generated text from a captured discussion, whether the speech-to-text conversation utilizes keyword grouping from sentences into one conversation and if there are multiple conversation threads, then for each identified thread (i.e., secondary thread), component 122 verifies with predetermined keywords (e.g., keywords associated with {actors, actions}) whether the conversation thread belongs to existing user stories, (v) listing identified new words separately in each conversation thread, and (vi) creating a new story if the identified actors or actions are new or the actor/action are existing but there are identified new attributes.

In step 210, component 122 identifies the probability of the keywords. In various embodiments, component 122 identifies the probability of the keywords being an object attribute or actions behavior based on an executed calculation. The executed calculation maybe the probability of a new word "a" being an attribute or behavior P(a)=frequency of "a" occurring in the conversation segment/(sum of product of frequency of occurrence of a keyword in the conversation segment across all the keywords represented in a leg of the graph or in one of the Venn diagram circles). For example, using the new words, and the frequency of other keywords belonging to user story"n" determine by probability if the new word can be an attribute or action. P(word a e.g deal)=$n_{deal}/\Sigma$(n keywords $\epsilon$ user story, in conversation segment) ($\epsilon$—symbol for "belonging to").

In step 212, component 122 determines if the object attribute or actions behaviors are new. In various embodiments, based on the probability of the keywords being an object attribute or actions behavior, component 122 determines if the object attribute or actions behaviors are new to the user story (e.g., have not been previously entered, seen, or recognized in the current user story). In the depicted embodiment, if component 122 determines the object attribute or actions behaviors are new to the user story (Yes step) then component 122 proceeds to step 214; however, if component 122 determines the object attribute or actions behaviors are not new to the user story (No step) then component 122 proceeds to step 216. In some embodiments, component 122 uses the new words, and the frequency of other keywords belonging to user story"n" to determine the probability of the new word can be an attribute or action, wherein if new words have a low probability for either attribute or action, then that conversation turn/thread can be a labeled as noise and placed on the noise list.

In step 214, component 122 creates a new user story. In various embodiments, component 122 creates a new user story based on the identified new object attribute or actions behaviors. In some embodiments, component 122 may generate and display, via interface 106, a responsive prompt that queries the user to confirm, reject or edit the newly generated user story. In some embodiments, component 122 may prompt the user to connect or co-mingle the new user story with the current user story.

In step 216, component 122 determines if the object attribute or actions behaviors are associated with an existing object in the user story. In various embodiments, component 122 determines if the one or more object attribute or actions behaviors are associated with one or more existing objects in the user story (e.g., current user story). In the depicted embodiment, if component 122 determines that the one or more object attribute or actions behaviors are associated with one or more existing objects in the user story (Yes step) then component 122 advances to step 220, however, if component 122 determines the one or more object attribute or actions behaviors are not associated with one or more existing objects in the user story, then component 122 advances to step 218. In some embodiments, component 122 uses the existing words in the user story, and the frequency of other keywords belonging to user story"n" to determine the probability of the identified attributes or actions are associated with an existing object, wherein if the identified attributes or actions have a probability outside or below a predetermined threshold range, then that conversation turn/thread can be a labeled as noise and placed on the noise list.

In step 218, component 122 labels the object attributes or action's behaviors as noise. In various embodiments, responsive to determining the one or more object attribute or actions behavior are not associated with an existing object in the user story, component 122 labels the one or more object attribute or actions behavior as noise.

In step 220, component 122 updates the user story. In various embodiments, component 122 updates the current user story based on the identified one or more object attribute or actions behavior.

Figure 3:
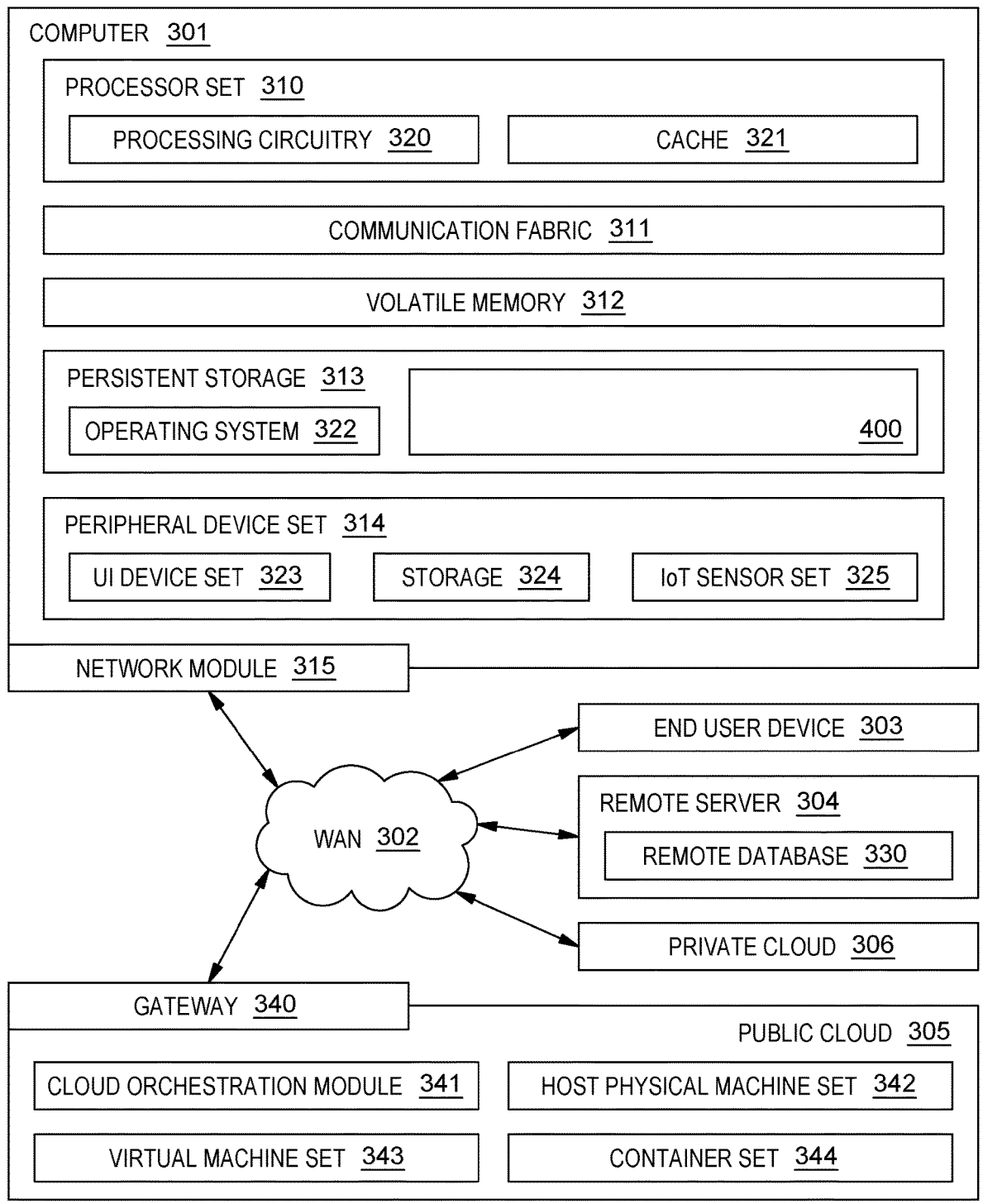
FIG. 3 depicts a block diagram of components of the server computer executing the software development life cycle framework component within the distributed data processing environment of FIG. 1A-1B, in accordance with an embodiment of the present invention.

FIG. 3 depicts a block diagram of components of server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as software development lifecycle (SDLC) framework code 400. In addition to SDLC framework code 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and SDLC framework code 400, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 1. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in SDLC framework code 400 in persistent storage 313.

COMMUNICATION FABRIC 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in SDLC framework code 400 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments.

Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central procession unit (CPU) power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   capturing, by a speech to text tool or an integrated web meeting tool and an enabled microphone, a discussion;
   capturing, by a natural language processor (NLP) and monitoring tools, keywords from the captured discussion;
   identifying a probability of the keywords being an object attribute or action behavior, wherein identifying further comprises:
      utilizing the NLP and a new word identifier to identify if an identified keyword is new by analyzing previously identified and stored keywords in a repository, wherein part-of-speech (POS) tagging and sentence simplifier is utilized to identify if the one or more identified keywords matches one of the previously identified or stored key words in the repository;
      responsive to identifying the keywords as a new, calculating the probability of the new or the previously identified keyword being an attribute or action in the current user story; and
      responsive to the calculated probability being below a predetermined threshold, labelling, by one or more processors, the keyword as noise and removing, by the one or more processors, the noise from the conversation;
   responsive to identifying, based on the probability, that the keywords are the object attribute or the action behavior, determining that the object attribute or the action behavior are not new to a first user story;
   reducing a predetermined amount of data required to enter a user story triad by utilizing sentences from the captured discussion and creating one or more triads from one or more sentences in the captured discussion;
   determining that the attribute or the action behavior are associated with an existing object in the first user story; and
   updating the first user story with the attribute or the action behavior.

2. The computer-implemented method of claim 1, further comprising:
   performing probabilistic calculation to determine if new keywords are attached to existing user story or new user story.

3. The computer-implemented method of claim 1, further comprising:
   responsive to identifying, based on the probability, that the keywords are the object attribute or the action behavior, determining that the object attribute or the action behavior are new; and
   generating a secondary user story based on the new object attribute or action behavior.

4. The computer-implemented method of claim 1, further comprising:
   detecting and removing of noise in the captured discussion.

5. The computer-implemented method of claim 1, further comprising:
   capturing a discussion, wherein the discussion is a live discussion or conversation, a pre-recorded discussion, or a messaging thread.

6. The computer-implemented method of claim 1, further comprising:
   saving the capture discussion on one or more databases.

7. The computer-implemented method of claim 1, further comprising:
   generating a graph based on the captured keywords.

8. A computer system, the computer system comprising:
   one or more computer processors;
   one or more computer readable storage devices; and
   program instructions stored on the one or more computer readable storage devices for execution by at least one of the one or more computer processors, the stored program instructions comprising:
      program instructions to capture, by a speech to text tool or an integrated web meeting tool and an enabled microphone, a discussion;
      program instructions to capture, by a natural language processor (NLP) and monitoring tools, keywords from the captured discussion;
      program instructions to identify a probability of the keywords being an object attribute or action behavior, wherein identifying further comprises:

program instructions to utilize the NLP and a new word identifier to identify if an identified keyword is new by analyzing previously identified and stored keywords in a repository, wherein part-of-speech (POS) tagging and sentence simplifier is utilized to identify if the one or more identified keywords matches one of the previously identified or stored key words in the repository;

responsive to identifying the keywords as a new, program instructions to calculate the probability of the new or the previously identified keyword being an attribute or action in the current user story; and responsive to the calculated probability being below a predetermined threshold, program instructions to label, by one or more processors, the keyword as noise and removing, by the one or more processors, the noise from the conversation;

responsive to identifying, based on the probability, that the keywords are the object attribute or the action behavior, program instructions to determine that the object attribute or the action behavior are not new to a first user story;

program instructions to reduce a predetermined amount of data required to enter a user story triad by utilizing sentences from the captured discussion and creating one or more triads from one or more sentences in the captured discussion;

program instructions to determine that the attribute or the action behavior are associated with an existing object in the first user story; and program instructions to update the first user story with the attribute or the action behavior.

9. The computer system of claim 8, further comprising:
program instructions to perform a probabilistic calculation to determine if new keywords are attached to existing user story or new user story.

10. The computer system of claim 8, further comprising:
responsive to identifying, based on the probability, that the keywords are the object attribute or the action behavior, program instructions to determine that the object attribute or the action behavior are new; and
program instructions to generate a secondary user story based on the new object attribute or action behavior.

11. The computer system of claim 8, further comprising:
program instructions to detect and remove of noise in the captured discussion.

12. The computer system of claim 8, further comprising:
program instructions to capture a discussion, wherein the discussion is a live discussion or conversation, a pre-recorded discussion, or a messaging thread.

13. The computer system of claim 8, further comprising:
program instructions to save the capture discussion on one or more databases.

14. The computer system of claim 8, further comprising:
program instructions to generate a graph based on the captured keywords.

15. A computer program product, the computer program product comprising:
one or more computer readable storage devices and program instructions stored on the one or more computer readable storage devices, the stored program instructions comprising:
program instructions to capture, by a speech to text tool or an integrated web meeting tool and an enabled microphone, a discussion;

program instructions to capture, by a natural language processor (NLP) and monitoring tools, keywords from the captured discussion;

program instructions to identify a probability of the keywords being an object attribute or action behavior, wherein identifying further comprises:

program instructions to utilize the NLP and a new word identifier to identify if an identified keyword is new by analyzing previously identified and stored keywords in a repository, wherein part-of-speech (POS) tagging and sentence simplifier is utilized to identify if the one or more identified keywords matches one of the previously identified or stored key words in the repository;

responsive to identifying the keywords as a new, program instructions to calculate the probability of the new or the previously identified keyword being an attribute or action in the current user story; and responsive to the calculated probability being below a predetermined threshold, program instructions to label, by one or more processors, the keyword as noise and removing, by the one or more processors, the noise from the conversation;

responsive to identifying, based on the probability, that the keywords are the object attribute or the action behavior, program instructions to determine that the object attribute or the action behavior are not new to a first user story;

program instructions to reduce a predetermined amount of data required to enter a user story triad by utilizing sentences from the captured discussion and creating one or more triads from one or more sentences in the captured discussion;

program instructions to determine that the attribute or the action behavior are associated with an existing object in the first user story; and program instructions to update the first user story with the attribute or the action behavior.

16. The computer program product of claim 15, further comprising:
program instructions to perform a probabilistic calculation to determine if new keywords are attached to existing user story or new user story.

17. The computer program product of claim 15, further comprising:
responsive to identifying, based on the probability, that the keywords are the object attribute or the action behavior, program instructions to determine that the object attribute or the action behavior are new; and
program instructions to generate a secondary user story based on the new object attribute or action behavior.

18. The computer program product of claim 15, further comprising:
program instructions to detect and remove of noise in the captured discussion.

19. The computer program product of claim 15, further comprising:
program instructions to save the capture discussion on one or more databases.

20. The computer program product of claim 15, further comprising:
program instructions to generate a graph based on the captured keywords.

* * * * *